US008433861B1

(12) United States Patent
Schlender et al.

(10) Patent No.: US 8,433,861 B1
(45) Date of Patent: Apr. 30, 2013

(54) METHOD AND APPARATUS FOR MANAGING ACCESS TO BACKUP DATA ON AN ARCHIVAL STORAGE SYSTEM THROUGH AVAILABLE MEDIA SERVERS

(75) Inventors: Thomas Schlender, Lino Lakes, MN (US); Brian Boehm, Oakdale, MN (US)

(73) Assignee: Symantec Corporation, Mountain View, CA (US)

( * ) Notice: Subject to any disclaimer, the term of this patent is extended or adjusted under 35 U.S.C. 154(b) by 863 days.

(21) Appl. No.: 12/237,800

(22) Filed: Sep. 25, 2008

(51) Int. Cl.
*G06F 12/16* (2006.01)
*G06F 13/00* (2006.01)

(52) U.S. Cl.
USPC .......................................... 711/161; 711/162

(58) Field of Classification Search .................. 711/161, 711/162
See application file for complete search history.

(56) References Cited

U.S. PATENT DOCUMENTS

| | | | | |
|---|---|---|---|---|
| 5,828,847 | A * | 10/1998 | Gehr et al. | 709/239 |
| 7,024,527 | B1 * | 4/2006 | Ohr | 711/161 |
| 7,058,717 | B2 * | 6/2006 | Chao et al. | 709/226 |
| 7,941,621 | B1 * | 5/2011 | Gipp et al. | 711/162 |
| 2004/0122832 | A1 * | 6/2004 | Heil | 707/100 |
| 2005/0193235 | A1 * | 9/2005 | Sandorfi et al. | 714/6 |

OTHER PUBLICATIONS

VERITAS NetBackup 6.0, System Administrator's Guide, vol. I, Sep. 2005, pp. i-594.*
VERITAS NetBackup Bare Metal Restore 6.0, System Administrator's Guide, Sep. 2005, pp. i-218.*

* cited by examiner

*Primary Examiner* — Yaima Campos
*Assistant Examiner* — Glenn Gossage
(74) *Attorney, Agent, or Firm* — Campbell Stephenson LLP

(57) ABSTRACT

A method and apparatus for managing access to backup data on an archival storage system through storage media servers are described. In some examples, read operations are initiated. Each of the read operations is targeted to a respective plurality of the media servers specific for reading backup data from the archival storage system. Each read operation is delegated to each of its respective plurality of media servers until one of the respective plurality of media servers is available. The backup data specified by each read operation is read by the one media server of the respective plurality of media servers that is available. Each read operation may comprise a backup restoration, backup duplication, backup verification, or synthetic backup operation. Read operations can be targeted to a first and second plurality of media servers, which may be mutually exclusive. The archival storage system can be a tape storage system.

14 Claims, 2 Drawing Sheets

METHOD AND APPARATUS FOR MANAGING ACCESS TO BACKUP DATA ON AN ARCHIVAL STORAGE SYSTEM THROUGH AVAILABLE MEDIA SERVERS

BACKGROUND OF THE INVENTION

1. Field of the Invention

The present invention relates generally to data backup systems. More particularly, the present invention relates to a method and apparatus for managing access to backup data on an archival storage system through media servers.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. To mitigate the risk of losing data, a computer system may include backup software for making backup copies of data stored on various storage devices. Some types of backup involve backing up data from a source system to a remote storage server over a network. The data may be backed up initially to disk-based storage and then migrated to an archival storage, such as tape-based storage.

The server(s) that perform the backup operations to write backup data to storage can subsequently be used to perform various read operations to read backup data from the storage. Read operations include restoration of the backup data, duplication of the backup data, and the like. When a read operation is requested, the backup system can select the same server that performed the initial backup operation to perform the read operation. However, there are several problems with such an approach. For example, if that server happens to be unavailable (e.g., due to server failure, network problems, etc), the read operation will fail. In some cases, the selected server may be overloaded with backup and/or read operations, whereas other servers may be under-utilized.

Accordingly, there exists a need in the art for a method and apparatus for managing access to backup data on an archival storage system through media servers that overcome the aforementioned disadvantages.

SUMMARY OF THE INVENTION

Aspects of the invention relate to a method, apparatus, and computer readable storage medium for accessing an archival storage system through media servers. In some embodiments, read operations are initiated. Each of the read operations is targeted to a respective plurality of the media servers specific thereto for reading backup data from the archival storage system. Each read operation is delegated to the respective plurality of media servers until one media server of the respective plurality of media servers is available. The backup data specified by each read operation is read by the one media server of the respective plurality of media servers that is available.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
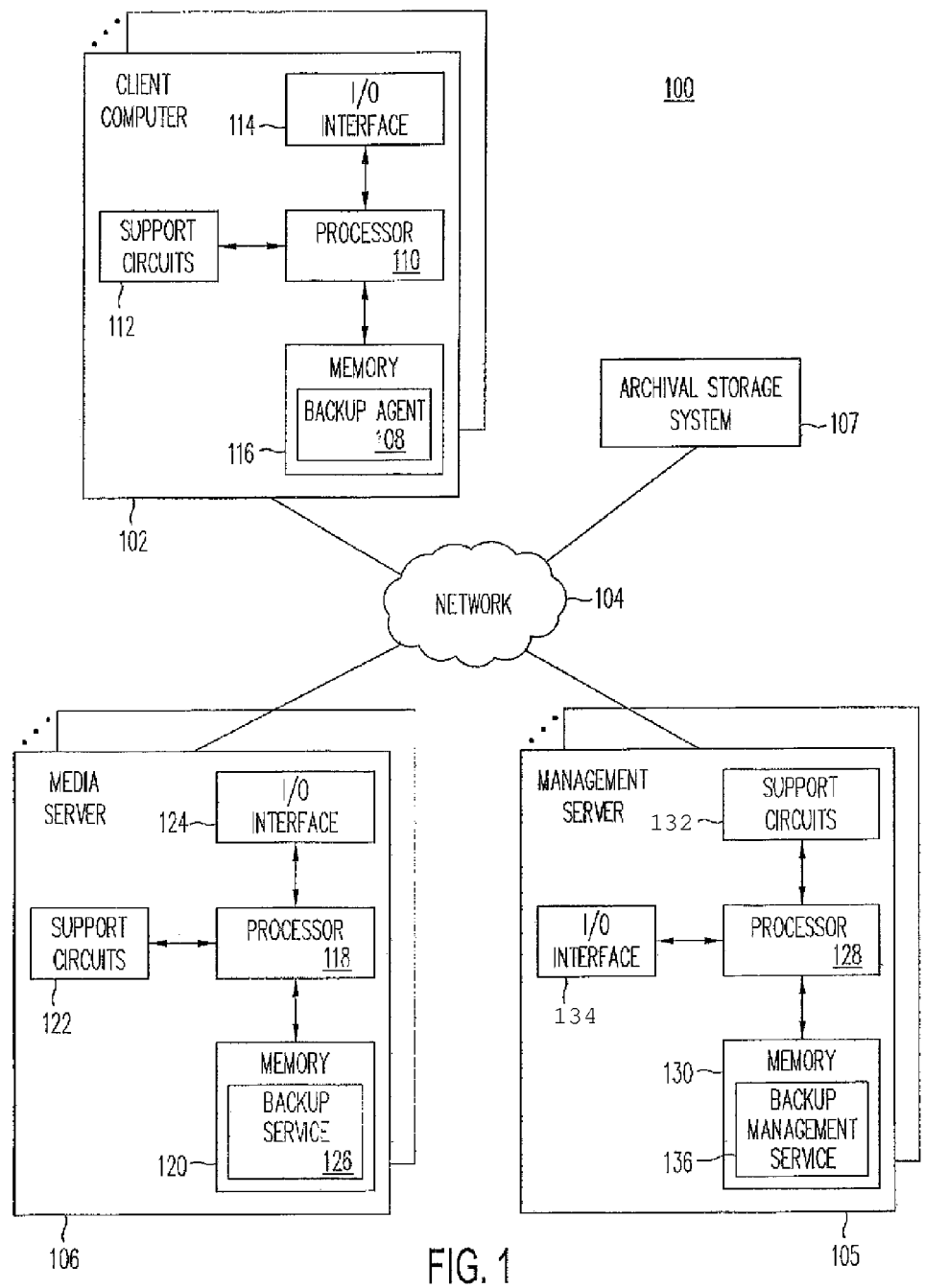
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes client computers 102, a network 104, media servers 106, management servers 105, and an archival storage system 107. The network 104 comprises a communication system that connects computer systems by wire, cable, fiber optic, and/or wireless links facilitated by various types of well-known network elements, such as hubs, switches, routers, and the like. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN).

Each of the client computers 102 includes a processor 110, a memory 116, various support circuits 112, and an I/O interface 114. The processor 110 may include one or more microprocessors known in the art. The support circuits 112 for the processor 110 include conventional cache, power supplies, clock circuits, data registers, I/O interfaces, and the like. The I/O interface 114 may be configured for communication with network 104. The memory 116 may include one or more of the following random access memory, read only memory, magneto-resistive read/write memory, optical read/write memory, cache memory, magnetic read/write memory, and the like. Each of the client computers 102 may implement a backup agent 108. The backup agent 108 may comprise software executable by the processor 110 to initiate backup and restoration processes for the respective client computer 102.

Each of the media servers 106 includes a processor 118, a memory 120, various support circuits 122, and an I/O interface 124. The processor 118 may include one or more microprocessors known in the art. The support circuits 122 for the processor 118 include conventional cache, power supplies, clock circuits, data registers, I/O interfaces, and the like. The I/O interface 124 may be configured for communication with network 104. The memory 120 may include one or more of the following random access memory, read only memory, magneto-resistive read/write memory, optical read/write memory, cache memory, magnetic read/write memory, and the like. Each of the media servers 106 may implement a backup service 126. The backup service 126 may comprise software executable by the processor 118 to cooperate with backup agents for making and restoring backups to and from client computer 102.

Each of the management servers 105 includes a processor 128, a memory 130, various support circuits 132, and an I/O interface 134. The processor 128 may include one or more microprocessors known in the art. The support circuits 132 for the processor 128 include conventional cache, power supplies, clock circuits, data registers, I/O interfaces, and the like. The I/O interface 134 may be configured for communication with network 104. The memory 130 may include one or more of the following random access memory, read only memory, magneto-resistive read/write memory, optical read/write memory, cache memory, magnetic read/write memory, and the like. Each of the management servers 105 may implement a backup management service 136. The backup management service 136 may comprise software executable by the processor 128 to cooperate with backup agents and/or backup services for managing backups.

The archival storage system 107 is configured to store backup data for the client computers 102. The archival storage system 107 may include one or more storage devices for storing the backup data. In some embodiments, the archival storage system 107 includes one or more tape storage devices for storing the backup data on tape media. While tape storage is described as an example of archive storage, it is to be understood that the archival storage system 107 may include other types of devices, such as hard disks, compact disc (CD) storage, digital versatile disc (DVD) storage, and the like known in the art. The archival storage system 107 is coupled to the network 104.

In operation, the backup agent 108, the backup service 126, and the backup management service 136 in each of the client computers 102, the media servers 106, and the management servers 105, respectively, cooperate to create a backup system. In the backup system, data on the client computers 102 can be backed up to the archival storage system 107 using the media servers 106 under management of the management servers 105. The management servers 105 and the media servers 106 can then manage the backup data on the archival storage system 107, including execution of various read operations. Exemplary read operations include restoration of backup data to the client computers ("backup restoration"), duplication of previously stored backup data ("backup duplication"), verification of the integrity of previously stored backup data ("backup verification"), synthetic backups, and the like. A "synthetic backup" is the synthesis of a complete backup image from multiple incremental backup images, as known in the art. Notably, embodiments of accessing the archival storage system 107 through the media servers 106 are described. The methods and processes described herein may be performed by the backup agent 108, the backup service 126, or the backup management service 136, or distributed across any combination of such agent and/or services.

Figure 2:
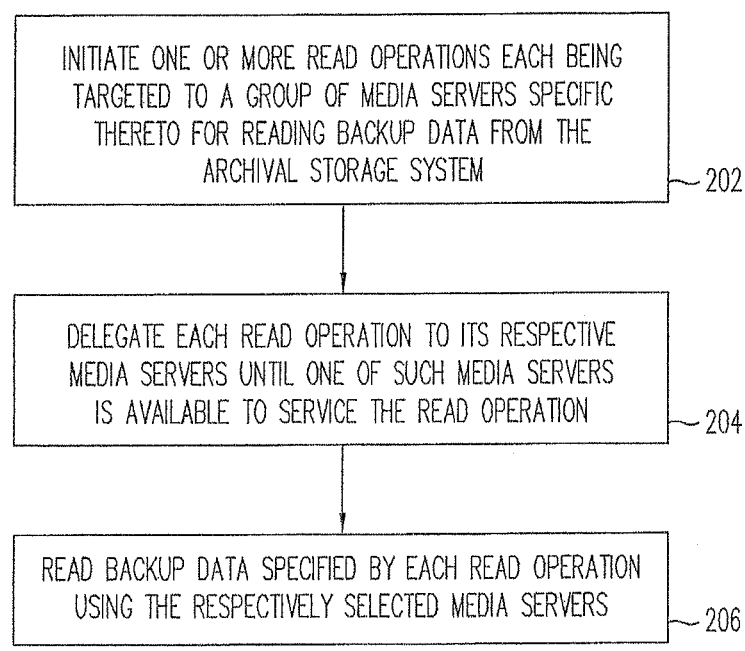
FIG. 2 is a flow diagram depicting a method of accessing an archival storage system through media servers according to some embodiments of the invention.

FIG. 2 is a flow diagram depicting a method 200 of accessing an archival storage system through media servers according to some embodiments of the invention. The method 200 may be performed by the computer system 100 of FIG. 1 using the backup agent 108, the backup service 126, or the backup management service 136, or any combination thereof. The method 200 begins at step 202, where one or more read operations is/are initiated, each being targeted to a group of media servers 106 specific thereto for reading backup data from the archival storage system 107. Exemplary read operations include backup restoration operations, backup duplication operations, backup verification operations, and synthetic backup operations. In essence, a group of media servers 106 is specified for each read operation requested. In addition, the group of media servers 106 can be defined per read operation. That is, different read operations can specify different groups of media servers 106. Two different groups of media servers 106 for two different read operations may include one or more common media servers 106, or may be entirely mutually exclusive to one another (i.e., no common media servers). In some embodiments, read operations are initiated by the backup management service 136.

At step 204, each read operation is delegated to each of its respective media servers 106 until one of such media servers 106 is available to service the read operation. In some embodiments, a read operation can specify a default media server in its group. The read operation can be delegated to the default media server first. If the default media server is not available, the read operation can be delegated to one or more other media servers in the group until an available media server is found to handle the read request. In some embodiments, a preferred order of the media servers in the group can be established such that this order is followed when trying one media server to the next. In some embodiments, the group of media servers specified for a given read operation may include at least one media server that did not previously handle the backup operation for the requested backup data. Thus, in some cases, the media server selected from the group to handle a particular read operation may be different from the media server that initially backed up the data being read. Accordingly, if the media server that initially backed up the data being read is not available (e.g., inoperable, not connected to the network 104, etc.), the read operation does not immediately fail. Rather, if another media server in the specified group is available, the read operation will be delegated and may succeed. In some embodiments, the read operations are delegated by the backup management service 136 to the backup service 126.

At step 206, backup data specified by each read operation is read using the respectively selected media servers to which the read operations have been delegated. The read operations may be performed by the backup service 126 in the selected media servers 106.

In this manner, a form of high availability is provided for backup data read operations without providing complex and expensive clustering software and hardware. In addition, since a group of media servers can be specified per read operation, a form of load balancing can be provided. For example, different sets of backups to be duplicated can be directed to different groups of media servers. In another example, not all of the client computers 102 may be capable of communication with all of the media servers 106. In such case, a group of media servers can be specified for a particular read operation that has connectivity to a particular client computer that is to receive the data of the read operation (e.g., a backup restoration operation).

Aspects of the methods described above may be implemented as a program product for use with a computer system. A program or programs of the program product defines or define functions of embodiments and can be contained on a variety of computer readable media, which include, but are not limited to: (i) information permanently stored on non-writable storage media (e.g., read-only memory devices within a computer such as compact disc-read only memory (CD-ROM) or digital versatile disc-read only memory (DVD-ROM) disks readable by a CD-ROM drive or a DVD drive); and (ii) alterable information stored on a writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of accessing an archival storage system through media servers, the method comprising:

initiating one or more read operations, wherein
  each read operation of the one or more read operations is a backup duplication operation, a backup verification operation, or a synthetic backup operation,
  the each read operation is targeted to a corresponding plurality of the media servers,
  the corresponding plurality of the media servers is specific to the each read operation, and
  the corresponding plurality of the media servers is specific for reading backup data from the archival storage system;
delegating the each read operation to each of the corresponding plurality of the media servers until one media server of the corresponding plurality of the media servers is available to service the each read operation, wherein
  the each read operation specifies at least one of a default media server to be used, and a preferred order of media servers to be employed; and
reading the backup data specified by the each read operation at the one media server of the corresponding plurality of the media servers.

2. The method of claim 1, wherein, for the each read operation, the corresponding plurality of the media servers comprises at least one media server that did not write the backup data for that read operation to the archival storage system.

3. The method of claim 1, wherein the archival storage system comprises a tape storage system.

4. The method of claim 1, wherein
  the one or more read operations comprise a first read operation and a second read operation,
  the first read operation is directed to a first plurality of the media servers,
  the second read operation is directed to a second plurality of the media servers, and
  the first plurality of the media servers is different from the second plurality of the media servers.

5. The method of claim 4, wherein the first plurality of the media servers is mutually exclusive of the second plurality of the media servers.

6. An apparatus for accessing an archival storage system through media servers, the apparatus comprising:
  a processor; and
  a memory coupled to the processor, wherein the memory stores program instructions executable by the processor to:
    initiate one or more read operations, wherein
      each read operation of the one or more read operations is a backup duplication operation, a backup verification operation, or a synthetic backup operation,
      the each read operation is targeted to a corresponding plurality of the media servers,
      the corresponding plurality of the media servers is specific to the each read operation, and
      the corresponding plurality of the media servers is specific for reading backup data from the archival storage system;
    delegate the each read operation to each of the corresponding plurality of the media servers until one media server of the corresponding plurality of the media servers is available to service the each read operation, wherein
      the each read operation specifies at least one of a default media server to be used and a preferred order of media servers to be employed; and
    read the backup data specified by the each read operation at the one media server of the corresponding plurality of the media servers.

7. The apparatus of claim 6, wherein, for the each read operation, the corresponding plurality of the media servers comprises at least one media server that did not write the backup data for that read operation to the archival storage system.

8. The apparatus of claim 6, wherein the archival storage system comprises a tape storage system.

9. The apparatus of claim 6, wherein
  the one or more read operations comprise a first read operation and a second read operation,
  the first read operation is directed to a first plurality of the media servers,
  the second read operation is directed to a second plurality of the media servers, and
  the first plurality of the media servers is different from the second plurality of the media servers.

10. The apparatus of claim 9, wherein the first plurality of the media servers is mutually exclusive of the second plurality of the media servers.

11. A non-transitory computer readable storage medium having instructions stored thereon that when executed by a processor cause the processor to perform a method of accessing an archival storage system through media servers, the method of accessing comprising:
  initiating one or more read operations, wherein
    each read operation of the one or more read operations is a backup duplication operation, a backup verification operation, or a synthetic backup operation,
    the each read operation is targeted to a corresponding plurality of the media servers,
    the corresponding plurality of the media servers is specific to the each read operation, and
    the corresponding plurality of the media servers is specific for reading backup data from the archival storage system;
  delegating the each read operation to each of the corresponding plurality of the media servers until one media server of the corresponding plurality of the media servers is available to service the each read operation, wherein
    the each read operation specifies at least one of a default media server to be used and a preferred order of media servers to be employed; and
  reading the backup data specified by the each read operation at the one media server of the corresponding plurality of the media servers.

12. The non-transitory computer readable storage medium of claim 11, wherein, for the each read operation, the corresponding plurality of the media servers comprises at least one media server that did not write the backup data for that read operation to the archival storage system.

13. The non-transitory computer readable storage medium of claim 11, wherein
  the one or more read operations comprise a first read operation and a second read operation,
  the first read operation is directed to a first plurality of the media servers,
  the second read operation is directed to a second plurality of the media servers, and
  the first plurality of the media servers is different from the second plurality of media servers.

14. The non-transitory computer readable storage medium of claim 13, wherein the first plurality of the media servers is mutually exclusive of the second plurality of the media servers.

* * * * *